Dec. 27, 1938.   V. J. HARRIS   2,142,027
INDICATING MEANS
Filed Dec. 21, 1934
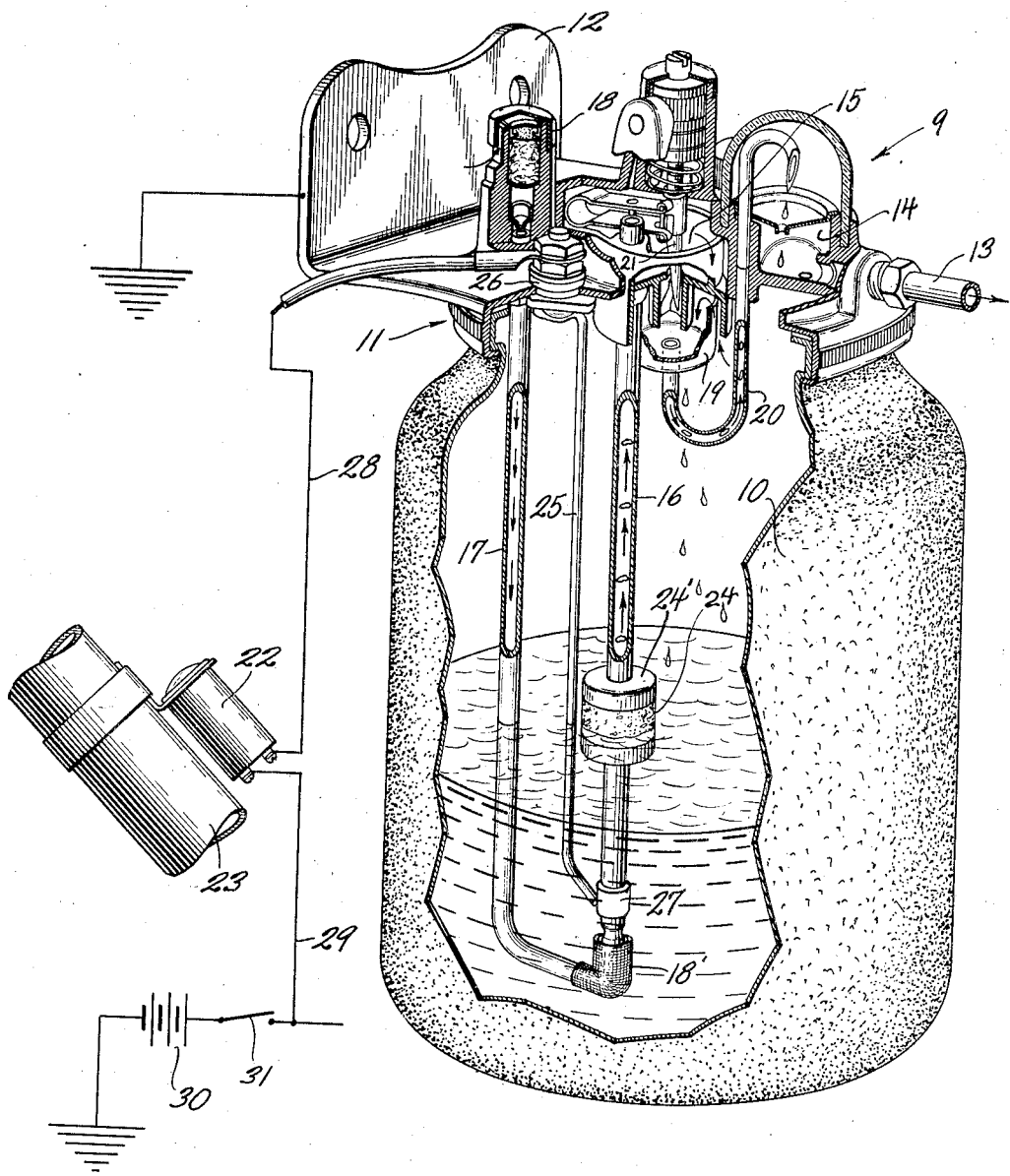
Inventor:
Vernon J. Harris Patented Dec. 27, 1938

2,142,027

UNITED STATES PATENT OFFICE 2,142,027

INDICATING MEANS

Vernon J. Harris, Cleveland, Ohio, assignor to Joseph Weidenhoff, Inc., Chicago, Ill., a corporation of Illinois Application December 21, 1934, Serial No. 758,635

1 Claim. (Cl. 200—84)

The invention relates to indicating means for use with a device, having a reservoir, for feeding liquid to the upper parts of an internal combustion engine and has as a general object to provide such a means having novel and improved means for indicating at a point remote from the device when the supply of liquid therein falls below a predetermined quantity.

More particularly the object is to provide a device for feeding liquid to the upper parts of an internal combustion engine having combined therewith an electric circuit controlled by a float in the reservoir of the device to energize an indicating device, such as a light, when the liquid in the reservoir falls below a predetermined level.

Yet another object is to provide a device for feeding or metering liquid to the upper parts of an internal combustion engine with parts of the device included in an electric circuit controlled by a float in the liquid supply container to energize an indicating device when the liquid falls below a predetermined level, the parts included in the circuit being supported from the closure for the container.

Other objects and advantages will become apparent from the following detailed description taken in connection with the accompanying drawing which illustrates the invention as embodied in a device for feeding or metering liquid to the upper parts of an internal combustion engine.

The one figure of the drawing shows a metering device in perspective but partially cut away to reveal the interior, and an indicating light diagrammatically shown connected thereto.

While the invention is capable of various modifications and alternative constructions and may be embodied in a variety of devices, it is for purposes of disclosure herein shown and described as embodied in a device for feeding or metering a liquid compound such as lubricant, anti-knock compound or a carbon removing compound to the upper parts of an internal combustion engine. More particularly the invention is disclosed as embodied in a lubricator for the upper parts of an engine of the type disclosed and claimed in the patent to Vernon J. Harris No. 1,960,584 dated May 29, 1934 and the application of Vernon J. Harris, Serial No. 753,570 filed November 19, 1934. However, it is not intended that the invention is to be limited to the specific embodiment shown but it is intended to cover all modifications and alternative constructions falling within the spirit and scope of the appended claim.

In the drawing, 9 designates generally a device for feeding or metering lubricant, anti-knock compound, carbon removing compound, or some other liquid to the upper parts of an engine. Hereinafter the device 9 will be known as a lubricator and is composed of a receptacle or liquid container 10, a closure or head 11 for the container and means for feeding or metering the liquid from the container formed in or supported by the head 11. Preferably the head 11 has a bracket 12 secured thereto serving as a means for mounting the lubricator.

As more fully described in my patent and my application, above referred to, liquid, more particularly lubricant, is discharged in regulated quantities to the intake manifold of the engine to be lubricated. Accordingly the manifold (not shown) is connected to the lubricator by means of a pipe 13 communicating with a chamber 14 formed in the head of the lubricator. Preferably lubricant is supplied to the chamber 14 in measured quantities and from a constant head regardless of the quantity of lubricant in the container 10. To that end the lubricator is provided with an auxiliary reservoir 15, also formed in the head 11, supplied with lubricant through a standpipe 16 extending downwardly to a point near the bottom of the container 10. The upper end of the standpipe projects through the bottom of the auxiliary reservoir 15 and upwardly beyond the top edge thereof so as not to be covered with lubricant when the reservoir 15 becomes filled.

In order to elevate lubricant through the standpipe 16, the upper end thereof, as will become apparent, is subject to the suction of the intake manifold and an air intake pipe 17 is provided which communicates with atmosphere at its upper end through air intake means generally designated 18 and at its lower end is bent to extend a short distance into the lower end of the standpipe 16. In this manner air under atmospheric pressure is admitted to the lower end of the standpipe below the level of the lubricant in the container and since the upper end of the standpipe is subject to the suction of the intake manifold, the air lifts the lubricant through the standpipe 16 and discharges the same into the auxiliary reservoir 15. The lower ends of the standpipe 16 and the air intake pipe 17 are enclosed in a screen 18' for filtering the lubricant drawn into the standpipe.

From the auxiliary reservoir 15 the lubricant passes through an aperture formed centrally of the bottom thereof and is caught in a cup 19 disposed below the aperture. From the cup 19 the lubricant is conducted by means of a conduit 20 to the chamber 14 from which it is drawn by suction through the pipe 13 to the intake manifold of the engine. The quantity of lubricant passing through the aperture in the reservoir 15 is controlled by means of an adjustable metering pin 21. The cup 19 is open to the container 10 so that the suction of the intake manifold is transmitted to the interior of the container, and the reservoir 15 also is open to the container so that any excess lubricant supplied to the reservoir by the standpipe 16 may overflow back into the container. In this manner a constant head of lubricant is maintained regardless of the level of the lubricant in the container.

A lubricator of the character defined is usually located near the engine and thus out of sight of the operator of the vehicle driven by the engine being lubricated. In order, therefore, that an operator of the vehicle may be warned of a depletion of the supply of lubricant while driving, means is provided for indicating such depletion at a point which is observable to the operator while in driving position. In the present instance this means takes the form of an electric light 22 here shown as secured to the steering column 23 of an automobile so as to be readily visible to the operator of the automobile. This light is included in an electrical circuit normally open and which is closed by means responsive to the level of lubricant in the container 10 when the lubricant falls to a predetermined level.

Herein the controlling means comprises a cylindrical float 24 of buoyant material, such as cork. This float is slidable vertically of the standpipe 16 and has metallic end caps 24' in electrical contact with the standpipe to constitute the movable element of an electric switch. The fixed element of the switch is formed by means of a rod 25 secured at its upper end to a terminal 26 mounted in insulated relation on the head 11. The rod extends downwardly parallel with the standpipe 16 and is spaced therefrom so as not to be contacted by the float 24 but at its lower end is bent toward the standpipe in order that it may be contacted by the float to close the circuit when the float drops to a predetermined level. The standpipe is provided with an insulating bushing 27 to prevent electrical contact between the standpipe and the lower end of the rod 25.

The standpipe 16 has a connection to ground through the head 11 and bracket 12, as shown diagrammatically in the drawing, and the rod 25 is connected by means of a lead 28 to one terminal of the light 22. A lead 29 connects the other terminal of the light to a battery 30 which is connected to ground in the usual manner to complete the circuit. A switch 31 may be inserted in the lead 29 to remove control of the light from the float 24 should it be desirable.

While the invention has been described as embodied in a device feeding lubricant it is to be understood, as above stated, that the device may feed any liquid other than lubricant, such as anti-knock compound or carbon removing compound, which is not conducting under low voltage. Nor is the invention to be limited to embodiment in a device of the specific character shown but may be applied to any container or reservoir for liquid.

It is believed apparent from the foregoing that I have provided an effective signal adapted to be located remote from the liquid container for giving a warning of the depletion of liquid within the container. This warning will be given when the level of liquid in the container 10 is still a substantial distance above the lower end of the standpipe 16 so that there is ample time to replenish the supply of liquid before the device ceases to function. The means controlling the circuit is concealed so as not to be subject to injury, it is positive in its operation, and is readily incorporated in newly manufactured devices of the character described.

I claim as my invention:

A device for feeding liquid comprising, in combination, a container for the liquid, a closure for the container, a liquid feeding standpipe of electrically conductive material mounted on the closure and extending downwardly from the closure to a point adjacent the bottom of the container to elevate the liquid, and means for indicating depletion of the liquid in the container comprising a float of buoyant material slidably mounted on said standpipe and having a metallic end cap of conducting material in electrical contact with said standpipe and a rod of conducting material supported in insulated relation on said closure and extending downwardly to a point adjacent the lower end of said standpipe and at its lower end bent downwardly and inwardly toward said standpipe to be contacted by the end cap of said float when the liquid drops to a predetermined level in the container, said inwardly and downwardly bent portion of the rod serving upon such contact of the float therewith to cam the float toward the standpipe to assure good electrical contact both between the float and the standpipe and between the float and the bent portion of the rod.

VERNON J. HARRIS.